(12) United States Patent
Hugot et al.

(10) Patent No.: US 10,963,167 B2
(45) Date of Patent: Mar. 30, 2021

(54) METHOD, FIRST DEVICE, SECOND DEVICE AND SYSTEM FOR MANAGING ACCESS TO DATA

(71) Applicants: GEMALTO SA, Meudon (FR); SafeNet Inc., Belcamp, MD (US)

(72) Inventors: Didier Hugot, Le Plessis Robinson (FR); Asad Ali, Austin, TX (US); Gorav Arora, San Jose, CA (US)

(73) Assignees: THALES DIS FRANCE SA, Meudon (FR); THALES DIS CPL USA, INC., Belcamp, MD (US)

( * ) Notice: Subject to any disclaimer, the term of this patent is extended or adjusted under 35 U.S.C. 154(b) by 0 days.

(21) Appl. No.: 15/858,882

(22) Filed: Dec. 29, 2017

(65) Prior Publication Data

US 2019/0205045 A1  Jul. 4, 2019

(51) Int. Cl.

| G06F 21/79 | (2013.01) |
|---|---|
| G06F 3/06 | (2006.01) |
| G06F 21/62 | (2013.01) |
| G06F 21/60 | (2013.01) |
| H04L 29/06 | (2006.01) |

(Continued)

(52) U.S. Cl.
CPC ............ *G06F 3/0622* (2013.01); *G06F 3/067* (2013.01); *G06F 3/0637* (2013.01); *G06F 21/31* (2013.01); *G06F 21/44* (2013.01); *G06F 21/604* (2013.01); *G06F 21/62* (2013.01); *H04L 63/08* (2013.01); *H04L 63/10* (2013.01); *G06F 21/79* (2013.01); *G06F 2221/2113* (2013.01); *G06F 2221/2129* (2013.01); *G06F 2221/2141* (2013.01); *H04L 2463/082* (2013.01)

(58) Field of Classification Search
None
See application file for complete search history.

(56) References Cited

U.S. PATENT DOCUMENTS

| 2015/0341391 A1 | 11/2015 | Menon et al. |
| 2016/0080421 A1 | 3/2016 | Hou et al. |
| 2017/0093867 A1 | 3/2017 | Burns et al. |

(Continued)

OTHER PUBLICATIONS

Notification of Transmittal of the International Search Report and the Written Opinion of the International Searching Authority (Forms PCT/ISA/220, PCT/ISA/210, and PCT/ISA/237) dated Feb. 11, 2019, in corresponding International Application No. PCT/EP2018/085298. (11 pages).

*Primary Examiner* — Brian R Peugh
(74) *Attorney, Agent, or Firm* — Buchanan Ingersoll & Rooney PC

(57) ABSTRACT

The invention relates to a method for managing data access. The method includes receiving at least one request for accessing data; capturing data relating to at least one current context signal during each data access request; comparing, as a current authorization step, the data relating to at least one captured current context signal to predetermined reference data relating to at least one corresponding context signal according to at least one corresponding predetermined authorization policy; determining, based upon the current authorization result and at least one predetermined dynamic data access policy, whether the data access is or is not authorized, as a data access decision; and issuing the data access decision. The invention also relates to corresponding first device, second device and system.

11 Claims, 1 Drawing Sheet

(51) Int. Cl.
*G06F 21/44* (2013.01)
*G06F 21/31* (2013.01)

(56) References Cited

U.S. PATENT DOCUMENTS

| | | | |
|---|---|---|---|
| 2018/0067848 A1* | 3/2018 | Baldwin | G06F 21/85 |
| 2018/0213401 A1* | 7/2018 | Yang | H04L 9/3247 |

* cited by examiner

METHOD, FIRST DEVICE, SECOND DEVICE AND SYSTEM FOR MANAGING ACCESS TO DATA

FIELD OF THE INVENTION

The present invention relates generally to a method for managing access to data.

The concerned invention also pertains to a first device for managing access to data.

The first device may be e.g. a Personal Computer (or PC), a mobile (tele)phone, an Internet Of Things (or IoT) device or any computing device.

The concerned invention relates to a first device for managing access to data as well. The second device may be e.g. a PC, a mobile phone, an IoT device or any computing device.

Furthermore, the invention pertains to a system for managing access to data as well. The system includes two or more devices including a first device and at least one second device.

The present invention is notably applicable to a field in which the first device is e.g. a PC, a mobile phone, an IoT device or any other computing device and the second device is e.g. a remote server or a (local) Secure Element (or SE).

Within the present description, an SE is a smart object that includes a chip(s) that protect(s), as a tamper resistant component(s), access to stored data and that is intended to communicate data with a device(s), like e.g., an SE host device, and/or an SE user.

State of the Art

It is known to use an Access Control List (or ACL) to define a list of access permissions/rules attached to an object, as data. The ACL specifies which user is granted access to an object as well as what operation(s) is(are) allowed on the object.

However, once a user has been authenticated and logged into an application, s/he gets access to the data, based on a corresponding ACL, that only rely on static data access rules. Such data access rules remain valid, even if, after a login data access, a current data access environment changes with respect to the (original) login data access environment.

There is a need of an alternative solution which is more secure over time than such an aforementioned known solution.

Summary of the Invention

The invention proposes a solution for satisfying the just herein above specified need by providing a method for managing access to data.

According to the invention, the method comprises:
  receiving at least one request for accessing data;
  capturing data relating to at least one current context signal during each data access request;
  comparing, as a current authorization step, the data relating to at least one captured current context signal to predetermined reference data relating to at least one corresponding context signal according to at least one corresponding predetermined authorization policy;
  determining, based upon the current authorization result and at least one predetermined dynamic data access policy, whether the data access is or is not authorized, as a data access decision; and
  issuing the data access decision.

The principle of the invention consists in dynamically controlling access to data while taking into account the context (or environment) at which each and every corresponding data access is requested, computing and delivering a data access decision.

Within the present description, the authorization policy is based on at least the authentication of a client, i.e. a human or a software component, and what the client is allowed or authorized to access.

The authorization policy may include, besides the client authentication, one or several conditions for one or several other context signals to be successfully satisfied.

The authorization policy may also change over time, i.e. not static.

The data access decision may be to grant possibly conditionally or deny access to the (requested) data. The data access decision that is issued depends on predefined context authorization and dynamic data access policies.

It is noteworthy that the invention does not impose any constraint neither as to where the (requested) data is actually stored nor as to who controls the data access, to compute and issue a data access decision.

Such a dynamic data access control comprises collecting, at a client device side and/or through one or several external sources, such as a server(s) for e.g. time, date, geolocation, a network parameter(s), at each and every received data access request, a current (local) context signal(s), and comparing the collected current context signal(s) to a corresponding predefined reference (or expected) context signal(s) depending on a corresponding predefined authorization policy.

Further to the current context signal process, the requested data access is granted possibly conditionally or denied, as a data access decision determining step, according to a predefined dynamic data access policy.

A presence or an absence of a response, as a data access request response, depends on the (pending) context signal(s) that is(are) valid, i.e. authorized (i.e. possibly authenticated), as the authorization policy, and, at each and every concerned data access request and the dynamic data access policy.

The authorization policy defines notably the number and/or the nature of the context signal(s) to be processed, assessed with respect to a condition(s) to be satisfied and authorized. The authorization policy may include data relating to the used (client) device, a human(s), an animal(s), an object(s) and/or thing(s) to be locally present and detected.

To capture the context signal(s), the invention does not impose any constraint. The client device may use a camera(s), a microphone(s) and/or one or several sensors, such as a biometric reader(s), that is(are) incorporated within or connected to the client device.

The context signal(s) may originate from one or several external sources, such as a server(s).

The invention solution is, through the authorization and dynamic data access policies, configurable and therefore adaptable to different (local) context scenarios.

A software component, such as a library, a hardware component and/or a device may carry out the authorization step and the data access decision determining step.

The software component may be supported by the client device, a local device, like an SE, cooperating with the client device, or a remote device, such as a server.

The hardware component may be incorporated within or connected or coupled to the client device, a local device, such as an SE, cooperating with the client device, or a remote device, such as a remote server.

The invention solution is a context authorization solution that allows, as a risk (level) engine, assessing a risk level for the concerned context under survey at the moment of each and every data access request is being made.

Contrary to the aforementioned prior art solution, the invention solution is more secure than the known prior art solution since it is based on the (requested) data and the corresponding (data access request) context authorization at each and every time data access is requested.

The invention solution is thus dynamic, and context and data centric.

According to an additional aspect, the invention is a device for managing access to data.

According to the invention, the first device is configured to:
receive at least one request for accessing data;
capture data relating to at least one current context signal during each data access request;
compare, as a current authorization, the data relating to at least one captured current context signal to predetermined reference data relating to at least one corresponding context signal according to at least one corresponding predetermined authorization policy; and
determine, based upon the current authorization result and at least one predetermined dynamic data access policy, whether the data access is or is not authorized, as a data access decision.

According to an additional aspect, the invention is a device for managing access to data.

According to the invention, the second device is configured to:
receive data relating to at least one captured current context signal;
compare, as a current authorization, the data relating to at least one captured current context signal to predetermined reference data relating to at least one corresponding context signal according to at least one corresponding predetermined authorization policy;
determine, based upon the current authorization result and at least one predetermined dynamic data access policy, whether the data access is or is not authorized, as a data access decision; and
issue the data access decision.

According to still a further aspect, the invention is a system for managing access to data.

According to the invention, the system comprises a first device and at least one second device. The second device being connected to the first device, the first device is configured to:
receive at least one request for accessing data;
capture data relating to at least one current context signal during each data access request;
send to the second device the data relating to at least one captured current context signal; and
the second device is configured to:
compare, as a current authorization, the data relating to at least one captured current context signal to predetermined reference data relating to at least one corresponding context signal according to at least one corresponding predetermined authorization policy;
determine, based upon the current authorization result and at least one predetermined dynamic data access policy, whether the data access is or is not authorized, as a data access decision; and
issue the data access decision.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered an exemplary embodiment in which the invention method for managing access to data is implemented notably by a PC, as a client (computer) device and a standalone entity, i.e. without cooperating with another device, such as an SE, and a remote server, as a context authorization and data access decision making device.

According to another exemplary embodiment (not represented), the invention method for managing access to data is implemented by a computer device, as a terminal, in cooperation with an SE embedded within or connected to the terminal. According to such an embodiment, the SE, as a local and context authorization and data access decision issuing device, is adapted to perform the functions that are carried out by the server and described herein below while enhancing the security of stored and/or processed data.

The SE may be an incorporated chip, as a chip soldered, possibly in a removable manner, like e.g., an embedded SE, a Trusted Execution Environment (or TEE), as a secure area of a PC processor and a secured runtime environment, an embedded Universal Integrated Circuit Card (or eUICC) or an integrated Universal Integrated Circuit Card (or iUICC), on a Printed Circuit Board (or PCB) of the terminal, or a chip that is coupled to the terminal and included within a Universal Serial Bus (or USB), a smart card or any other medium (that may have different form factors), as an SE host device. The chip may thus be fixed to or removable from its host device, like e.g., the PC (or a mobile phone).

The invention does not impose any constraint as to a kind of the SE type.

Naturally, the herein below described embodiment is only for exemplifying purposes and is not considered to reduce the scope of the present invention.

Figure 1:
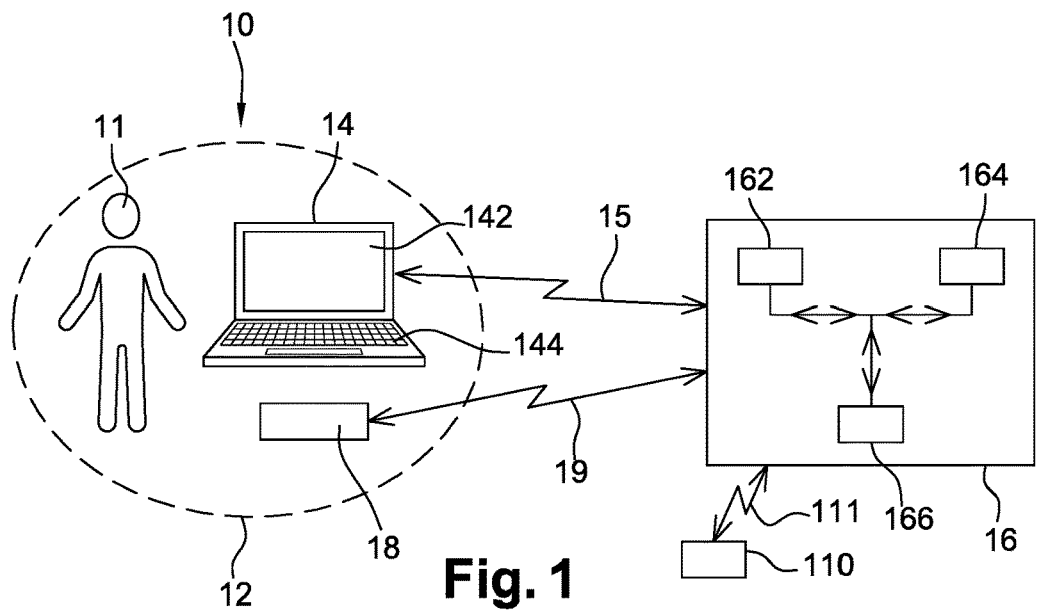
FIG. 1 illustrates a simplified diagram of an exemplary embodiment of a system comprising a PC and a server, the PC being configured to receive a data access request(s), capture a corresponding (PC) context signal(s) and possibly (an)other external source(s), and send to the server data relating to the captured context signal(s), the server being configured to control dynamically access to data, based on the captured context (signal) data and a predefined Dynamic Data Access Policy (or DDAP), according to the invention.

FIG. 1 shows schematically a data access managing system 10 that includes a PC 14, as a first and client device, and a remote (web) server 16, as a second device.

The system is arranged to authorize (or not), based on a predefined authorization policy, a context 12 under survey at each and every data access request and compute and issue, based on the authorization result and a predefined DDAP, a decision relating to the concerned data access request.

The authorization policy is based on at least an authentication of the client, i.e. the user 11 (or a software component).

The context 12 includes e.g. a user 11, as the owner of the PC 14, and the PC 14 itself, as one (physical) object or thing.

The context 12 may include a temperature sensor 18, as an external local source.

Additionally (or alternately), the context 12 includes e.g. one or several local devices, such as a mobile phone (not represented), as an object(s) or thing(s).

The context 12 may include a server 110, as an external network source, like e.g. a server that captures time of the day, as context signal data.

Additionally (or alternately), the context 12 includes e.g. one or several remote devices, such as a server and/or a network, that allow to capture, at the server and/or network side, server data and/or network data, as context signal data.

However, the invention solution is also applicable when the context 12 includes (an)other human being(s) (and/or an animal(s)) and/or (an)other thing(s).

For the sake of simplicity, only one PC 14 and only one user 11, as two elements belonging to the context 12, have been represented.

The PC 14 allows receiving one or several requests for accessing data and capturing one or several corresponding current context signals at each and every data access request.

The data requested to be accessed may include binary data, human readable data, one or several secrets, one or several instructions (or code) relating one or several programs or any type of data.

The server 16 manages a set of client (user and/or application) accounts and respective reference context signals that have been previously respectively registered.

Instead of being constituted by a PC, the first device may be constituted by e.g., a smart phone, a vehicle, a virtual reality device, an augmented reality device, an Internet Of Things (or IoT) type device, a set-top box, a tablet computer, a desktop computer, a laptop computer, a video player, an audio player, a media-player, a game console, a netbook, a Personal Digital Assistant (or PDA) and/or any other computer device. Such a list of first devices is given as mere examples for a first device that may be used without being exhaustive.

Instead of being constituted by a physical first device, a software component, such as a library, or a hardware component included within or connected to the first device carries out the functions that are described infra and that are performed by the PC 14.

The PC 14 includes one or several Central Processing Unit(s) (or CPU), (micro)processor(s) and/or (micro)controller(s) (not represented), as data processing means, one or several memories (not represented), as data storing means, and one or several Input/Output (or I/O) interfaces (not represented).

The (or each) PC processor processes data originating from and/or intended to any internal component and data originating from and/or intended to any external device through one or several PC I/O interfaces.

The PC memories may include one or several EEPROMs (acronym for "Electrically Erasable Programmable Read-Only Memory"), one or several ROMs (acronym for "Read Only Memory"), one or several Flash memories and/or any other memories of different types, like e.g., one or several RAMs (acronym for "Random Access Memory").

The PC 14 supports one or several Operating Systems (or OS).

The PC 14 supports a client application that allows the PC 14 to send, after a capture of one or several current context signals during each data access request, corresponding data relating to the captured context signal(s), to the server 16.

A PC 14 memory (and/or a memory of another device connected or coupled to the PC 14) stores an Internet Protocol address, as a PC 14 Identifier (or ID), and/or other data that allow(s) uniquely identifying the PC 14, as the first device.

The PC I/O interface(s) may comprise (and/or be connected to) a display screen 142 and a keyboard 144, as a PC Man Machine Interface (or MMI), so as to interact with the user 11.

The PC 14 is able to receive, possibly from an application that is being executed by a (or the) PC processor and/or further to a user initiative through the PC MMI, one or several requests for accessing data.

The PC 14 is arranged to capture data relating to one or several signals relating to one or several elements included in the current context 12 (relating to the PC 14) when each and every data access request is received.

As current context signal(s) data, it may notably include:
- a type of the requested data, such as Personal Identifiable Information (or PII) or Service Personal Information (SPI), a data classification level, a data ownership, a data access delegation or one or several data operations that the data (and/or associated metadata) should undergo;
- a user identity(ies), such as a user IDentifier(s) (or ID), a group ID, a citizenship ID and/or a job title ID;
- a user environment data item(s): such as a user hearth rate and/or a user temperature;
- a device identity(ies), like e.g. a (known, unknown or trusted) device ID, a genuine device (i.e. not rooted),
- a device environment data item(s): such as a device configuration ID(s), such as OS version and/or an application version;
- a current context, as the context that is valid at the exact time the data is requested to be accessed, such as data relating to the concerned client device, like e.g. a browser ID on a windows machine, and environment information, such as an IP address, a current time, data relating to a current location;
- an authorization context, as the client context while being authenticated in the concerned application at a login time (and therefore prior to a current authorization when carried out at least a second time);
- historical data item(s), such as the number of times the data has been requested to be accessed and/or the previous possible corresponding data access decisions (grant or deny);
- an anomaly detection while using a Machine Learning (or ML) engine on all of the other context signals and historical data to analyse a current captured context signal(s) that is valid at a (pending) data access request to detect one or several anomalies.

As data operation(s), it may include a Creation, a Reading, an Update, a Deletion (o removal), a data sharing, a change of ownership of the data, a data visibility, a change of data classification level and/or any other operation.

The PC I/O interface(s) may include e.g. a camera(s) (not represented), so as to capture a current video (or picture) signal(s) that is(are) included in the environment or context 12 that is present in front of the camera and valid at each and every data access request.

The PC I/O interface(s) may include (or be connected or coupled to) e.g. one or several sensors that allow each to capture a signal(s) relating to the current context 12 of the PC 14 that is valid at each and every data access request.

The PC I/O interface(s) may include e.g., an antenna (not represented), allowing to transmit data, through e.g. a wireless link 15, via one (communication) network(s), such as Intranet and/or Internet, to the server 16.

The link 15 between the PC 14 and the server 16 is at least mono-directional, namely at least an uplink, i.e. from the PC 14 to the server 16.

The channel using the link 15 may be secure or unsecure.

The channel may be related to an HyperText Transfer Protocol (or HTTP) (registered trademark) type channel, an HTTP Secure (or HTTPS) type channel or any other data communication channel.

The PC 14 is configured to send to the server 16 data relating to one or several current captured context signals during each and every data access request.

Such a transmission of captured context signal data valid at each data access request allows the server 16 to (re) process, (re)assess, i.e. (re)authorize (or not), each time the data is requested to be accessed. Such a re-authorization of the current captured context signal data allows taking into account each context 12 that changes with respect to a previous (context) authorization that was valid at a corresponding previous data access request.

The context signal data may include data relating to the user 11, data relating to the PC 14, such as an IP address, and/or other data.

Instead of being constituted by a (physical) server, the second device may be constituted by e.g., a smart phone, a PC, a vehicle, a virtual reality device, an augmented reality device, an Internet Of Things type device, a set-top box, a tablet computer, a desktop computer, a laptop computer, a video player, an audio player, a media-player, a game console, a netbook, a PDA and/or any other computer device. Such a list of second devices is given as mere examples for a second device that may be used without being exhaustive.

Instead of being constituted by a physical second device, a software component, such as a library, or a hardware component included in (or connected to) the first device carries out the functions that are described infra and that are performed by the server 16.

The server 16 is preferably accessed through an associated Application Provider Interface (or API) (or Service Provider Interface (or SPI)).

The server 16 is connected to the PC 14 over the link 15.

The server 16 may be connected to the temperature sensor 18 over the link 19.

The server 16 may be connected to the server 110 over the link 111.

The server 16 may include at the server side or be connected to a machine learning model that accesses historical data, such as past user behaviours. The machine learning model may detect one or several anomalies. The anomaly detection includes detecting a change of one (or several) of the captured context signal(s) with respect to one or several corresponding captured (past) previous context signal(s). The anomaly detection (when it occurs) (carried out e.g. by a machine learning model) allows changing dynamically the predetermined DDAP.

The server 16 is remote and accessible through possibly one, two or more communication networks, such as an Intranet network and/or an Internet network, that allow to define or form a corresponding communication channel.

According to an alternative embodiment (not represented), the server 16 or a software component is local. For example, the server 16 is embedded within a device, such as an SE that is connected or coupled to the PC 14.

The server 16 may be operated or managed by a Mobile Network Operator (or MNO), a Mobile Virtual Network Operator (or MVNO), a banking Operator, a wire communication network operator, a service Operator (or administrator) or on behalf of a service Operator, as a service provider.

The server 16 includes one or several CPU(s), (micro) processor(s) and/or (micro)controller(s) 162, as data processing means, one or several memories 164, as data storing means, and one or several I/O interfaces 166 that are internally together connected.

The (or each) server processor processes data originating from and/or intended to any internal component and data originating from and/or intended to any external device through one or several server I/O interfaces.

The server 16 supports one or several OSs.

The server 16 supports a server application that allows the server 16, after a reception of data relating to one or several context signals valid at each data access request and a corresponding authorization, to determine, based on the authorization result and a predetermined DDAP(s), whether the data access is (or not) authorized, as data access decision, and provide the data access decision.

A (or the) server I/O interface 166 is used for communicating with an external device(s), such as the first device 14.

A (or the) server memory 164 stores preferably, besides an OS, an invention (server) authorization application accessible from the server 16 processor.

A (or the) server memory 164 stores or registers a database.

The database includes a set of client accounts. The client may be a user (human), a machine or any device, such as an IoT type device.

Each client device account may include one or several associated user identifiers, such as a user name(s).

The database includes preferably, in association with) each (identified) client account (or a client fleet), a corresponding predetermined authorization policy and/or a corresponding predetermined DDAP.

The database includes preferably, in association with each (identified) client account, predetermined reference data relating to one or several context signals, so as to verify whether data (to be received from the first device or an external device(s), that may be local or remote) relating to each captured context signal (to be authorized according to the authorization policy), does or does not verify the predetermined reference data relating to the corresponding context signal.

The authorization policy allows configuring the server 16 to process data originating from a surrounding environment or context of the PC 14, so as to authorize or not the concerned current context 12 at each data access request.

The authorization policy comprises a set of identified context signals to be captured and authorized, so as to define context signals to be captured at each data access request.

The authorization policy may also define how the concerned context signal data valid at each data access request is to be processed at the server 16.

The authorization policy may comprise data for identifying an algorithm to be used for processing data relating to the (or each) captured context signal(s) to be received from a client device.

The authorization policy may define how each tested context signal is to be authorized. For example, the user 11 has to authenticate by providing a Personal Identity Number (or PIN), a One Time Password (or OTP), a password and/or a biometric user feature(s), such as a one or several user fingerprints, a user iris, a user face and/or a user palm(s). For example, the PC 14 has to authenticate by providing a response to a challenge sent previously by or through the server 16. Each reference data relating to a context signal has been previously (i.e. during an enrolment or registration phase and prior to any (context) authorization) registered.

The server 16 is adapted to receive, from an (identified) client device, such as the PC 14, data relating to one or several current context signals valid only at each and every data access request.

The server 16 identifies, based on a received e.g. client device ID(s), a corresponding first device registered within the database accessible to the server 16.

Then, the server 16 retrieves data relating to each (predetermined) reference context signal and that is registered in association with the registered client device.

The server 16 is arranged to process, assess and determine whether the context signal(s) satisfy(ies) one or several conditions to be satisfied individually or collectively or in a predetermined combination, so as to determine an authorization result based on a predefined authorisation policy.

The server 16 may be configured to compare, as a current authorization, data (to be received) relating to one or several current captured context signals to the (registered) reference data relating to one or several corresponding context signals respectively according to the (registered) authorization policy(ies).

The server 16 is adapted to authorize successfully or not, based on the comparison or authorization result(s) and the authorization policy(ies), the concerned current captured context 12 signal(s).

More exactly, the server 16 is configured to fail to authorize the context 12, as a current negative authorization result, if, based on the comparison (or authorization) result(s) and the authorization policy(ies), data relating to one or several current context signals (to be authorized) does not satisfy the reference data relating one or several corresponding context signals.

The server 16 is configured to succeed in authorizing the context 12, as a current positive authorization result, if, based on the comparison (or authorization) result(s) and the authorization policy(ies), data relating to all of the current context signals (to be authorized) satisfies the reference data relating to all of the corresponding context signals.

The server 16 is adapted to determine, based on the current negative or positive authorization result and the DDAP, whether the data access is authorized or not, as a data access decision.

The DDAP allows to define by combining different context signals with their respective individual authorization result together a decision, i.e. grant or deny, relating to the data access.

The server 16 may be adapted to store, preferably in a secure and persistent manner, the (received) data relating to all of the current context signals in association with the corresponding authorization result(s) and the corresponding data access decision. Such a storage allows to trace the history (or evolvement) of the success and/or failure authorization(s) along with the corresponding data access decision(s).

The server 16 is preferably arranged to adapt, based on the DDAP, a provided data access decision (and response accordingly) when there is one or several changes between a current context signal authorization (valid) at the moment of the (pending) data access request and one or several previous recorded context signal authorizations at the corresponding past moments (such as a login time) of the previous data access requests.

The DDAP defines, if the data access is (or granted) or is not authorized (or denied), what entitlement(s) is(are) granted (to the client) and/or what condition(s) is(are) to be applied.

The DDAP may preferably allow providing the ability to detect a current context signal change, such as abnormal behaviours, as an anomaly detection, and associate a negative data access decision and thus protect access to the data that is currently being requested. The DDAP provides therefore the ability to dynamically change the data access decision to a negative data access decision, based on the current context signal(s) even if the client has been successfully authorized, i.e. authenticated at an application login.

The DDAP may include, if the data access decision is positive (i.e. the data access is granted), at least one element of a group comprising a data reading entitlement, a data sharing entitlement, a data creation entitlement, a data removal entitlement, a data update entitlement, a data writing entitlement and a metadata update entitlement, the metadata being associated with the concerned data.

Such a DDAP element list is not exhaustive.

Additionally or alternately, the DDAP may include, if the data access decision is positive or negative, as an additional condition(s) to be satisfied prior to and/or after granting access, the following steps of:

requesting to further authenticate the client, as requester, prior to granting access to data;

carrying out one or several actions, prior to granting access to data;

carrying out one or several actions, after granting access to data;

sending one or several predetermined alert message to one or several predetermined addressees.

Such a DDAP element list is not exhaustive.

Figure 2:
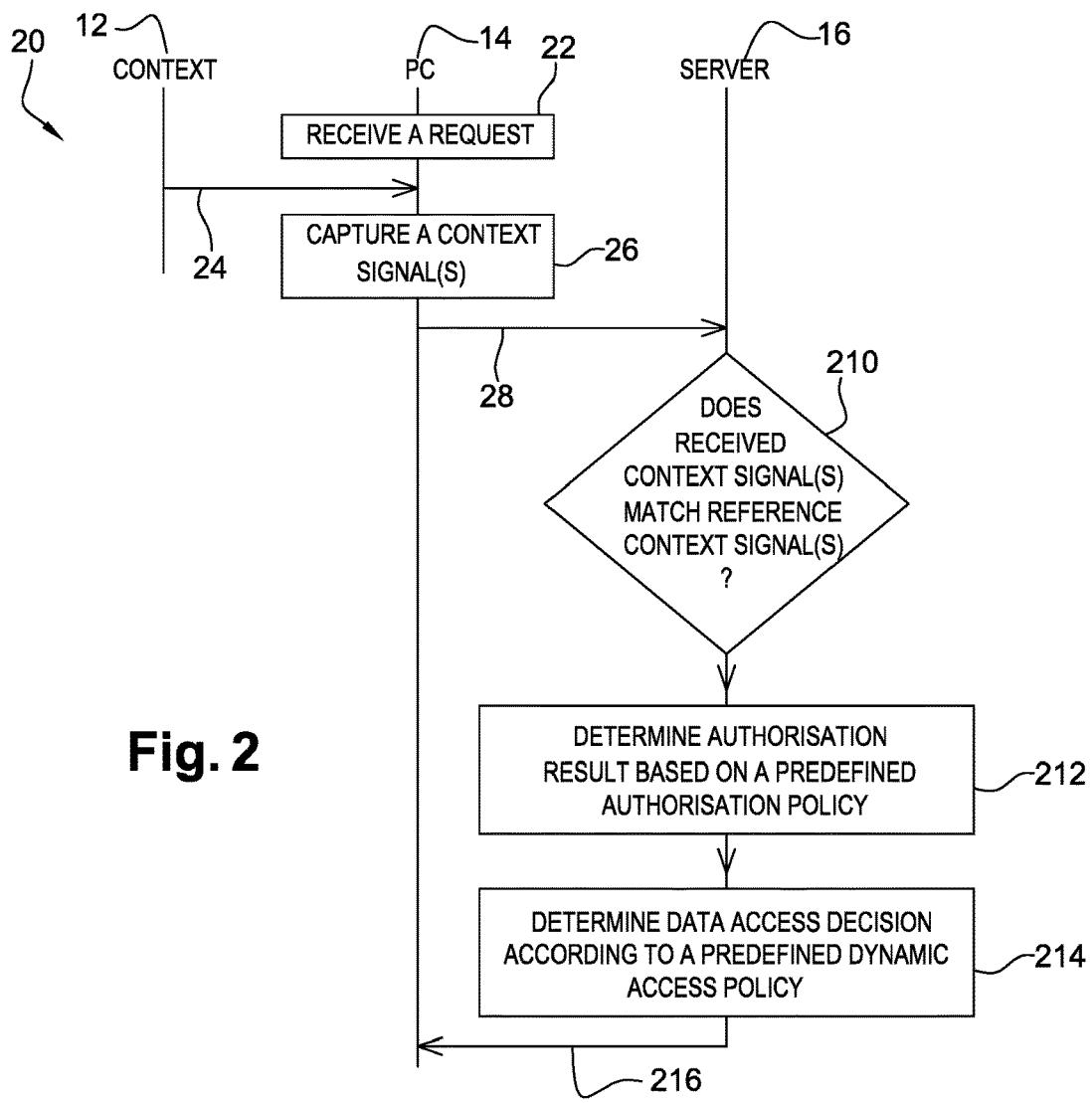
FIG. 2 represents an example of a flow of messages exchanged between the PC and the server of the system of FIG. 1, so that the server authorizes (or not), based on a predefined (context) authorization policy, the captured context data and issue a data access decision, based on the authorization result and the DDAP.

FIG. 2 depicts an example of a message flow 20 that involves the PC 14 and the server 16, so that the server 16 authorizes (or not) the current context 12 signal(s) based on the authorization policy and determines whether the data access is or is not authorized, as data access decision, based on the current authorization result(s) and the DDAP, and issue the data access decision.

It is assumed that the server 16 is alone to determine and issue data access decision. However, the server 16 may delegate to one or several servers, such as an IDentity Provider (or IDP) server(s), one or several operations while collecting back the result(s) of the delegated operations.

To authorize the current context signal(s), it is assumed that, as data processing, each current context signal is to be authenticated, as verification of satisfaction of an authorization rule. However, other data processing may be possible individually or collectively.

It is assumed that the authorization policy has been provided to the server 16 during a personalization phase. The authorization policy requests to capture user 11 ID, user 11 authentication data and a PC ID and PC authentication data, so as to authorize the user 11 and the PC 14 respectively. The authorization policy states that the PC 14 is authorized (or not respectively) if the submitted PC authentication data matches (or does not match respectively) reference PC authentication data, as a first partial authorization result (positive or negative respectively), and the user 11 is authorized (or not respectively) if the submitted user authentication data matches (or does not match respectively) reference user authentication data, as a second partial authorization result (positive or negative respectively). The authorization policy states that the global authorization result is positive if the first and second partial authorization results are both positive and is negative otherwise, if at least one the first and second partial authorization results is negative.

It is further assumed that the server 16 has previously registered (not represented) a user 11 ID, such as a user name, in association with the PC 14 IP address, as a PC ID, and predetermined reference user 11 authentication data and a predetermined DDAP.

The DDAP states e.g. the following:

DDAP1: if only the PC 14 is successfully authorized, then the server 16 sends, as a data access decision, to the PC 14, a deny to access the requested data, as a first negative attempt, while requesting, as a required action, during a further data access request an additional specific user authentication, such as a biometric feature, as a step-up authentication, so as to, further to the first negative attempt, grant (or deny) access to the requested data if there are two corresponding successful (failed) user authorizations, (while providing e.g. an expected PIN and an expected user fingerprint), during a second positive (or negative respectively) attempt;

DDAP2: if only the user 11 is successfully authorized, then the server 16 sends, as a data access decision, to the PC 14, a deny to access the requested data; and DDAP3: if the PC 14 and the user 11 are not successfully authorized, then the server 16 sends, as a data access decision, to the PC 14 a deny to access the requested data;

DDAP4: if the PC 14 and the user 11 are successfully authorized, then the server 16 sends, as a data access decision, to the PC 14, an access authorization possibly accompanied with the requested data and giving the user e.g. a CRUD entitlement;

DDAP5: if the PC 14 and the user 11 have been previously successfully authorized and are currently successfully authorized while an anomaly(ies), such as the used communication channel was, during a first data access session, secure and becomes currently unsecure, during a second (i.e. next) data access session, is(are) detected (through e.g. a machine learning model), then the server 16 sends, as the second data access decision, to the PC 14, a deny to access the requested data; and DDAP6: if the PC 14 and the user 11 have been previously successfully authorized during a first data access session, and one of the PC 14 and the user 11 is no longer successfully authorized, during a second (i.e. next) data access session, then the server 16 sends, as the second data access decision, to the PC 14, a deny to access the requested data;

It is further assumed that the PC 14 accesses the PC 14 ID and user authentication data, such as a PIN, submitted by the user 11 at each (pending) data access request and PC authentication data, such as an OTP that is generated locally based on a current time, at each data access request.

An execution of the client application supported by the PC 14 is automatically launched (i.e. without any involvement of the user 11) (not represented).

Alternately, the user 11 launches the client application while using an MMI that is included in or connected to the PC 14.

The PC 14 receives 22, possibly further to an initiative of the user 11, a current data access request.

The PC 14 receives, as the current context signal data 24, e.g. from an internal memory, the PC 14 ID, the current time (to be able to generate at the server 16 side the reference OTP) and the PC 14 submitted authentication data and, e.g. from the user 11 her/himself, the user 11 ID and the submitted user 11 authentication data.

The PC 14 captures 26 the current context signal data.

The PC 14 sends, through a secure channel, to the (identified) server 16 a message 28 that includes the current context signal data.

The server 16 identifies, at least for a second data access session, preferably the used channel, so as to know whether this latter is secure or unsecure.

Once the server 16 has received the message 28, the server 16 identifies (not represented), based on the user ID and the PC ID, the concerned client account and thus the associated predetermined user 11 authentication data and the associated predetermined PC authentication data.

Then, the server 16 generates (not represented) and preferably stores the reference OTP, as the reference PC authentication data, based on the (received) current time, as a current context signal data, and an OTP generation algorithm that is previously shared with the PC 14.

Then, the server 16 verifies 210 whether:
1. the received PC authentication data does or does not match the (registered) reference PC authentication data; and
2. the received user authentication data does or does not match the (registered) reference user authentication data.

Once the verifications 210 of the condition(s) to be satisfied by the context signal(s) (individually or collectively or in a combined manner) have been performed, the server 16 determines 212, based on the authorization policy, a corresponding current global authorization result that may be positive or negative.

Once the server 16 has determined the current global authorization result, the server 16 determines 214 whether the data access is granted or denied, as a data access decision, according to the current global authorization result and the DDAP.

If the current global authorization result is negative, then the server 16 does not authorize (or denies) access to the requested data, according to the DDAP, by sending to the PC 14 a corresponding (data access request) response refusal message 216 that includes e.g. a request of displaying a message of the type "not authorized". Such a response refusal message may further specify a corresponding reason (s), such as "the PC 14 is not authenticated" (in case of DDAP1 and DDAP3) and/or "the user 11 is not authenticated" (in case of DDAP2 and DDAP3) and/or may request to further authenticate the requester, as an action, such as "please submit additionally your fingerprint (in case of DDAP1). To deny access to the requested data, the server 16 may disconnect the open requester session and/or carry out one or several actions, such as an additional authentication (s). Thus, the requester does not access, as a data access request response, the requested data.

If the current global authorization result is positive, then the server 16 authorizes (or grants) access, according to the DDAP, to the requested data. The server 16 sends then to the PC 14 a corresponding success message 216 that includes e.g. a request of displaying a message of the type "authorized". Such a success message may further include e.g. the requested data (in case of DDAP4). The message 216 may further, according to the DDAP, specify the corresponding obtained entitlement(s) relating to the concerned data, such as a data creation entitlement, a date reading entitlement, a data update entitlement and/or a data deletion entitlement.

The server 16 may further send an alert message(s) (not represented) to one or several predetermined addressees, irrespective of whether the current global authorization result is positive or negative.

The server 16 stores (not represented) preferably, for each current data access session, the corresponding context signal data, the partial and global authorization result(s), the data access decision possibly with the further condition(s) to be satisfied and/or the possible performed action(s).

Once the server 16 has granted access to the concerned data during a first data access session and, during a second data access session, the PC 14 and the user 11, as the context signal are still successfully authenticated, the server 16 further detects, during the second data access session, one or several anomalies, such as the use of an unsecure channel, (instead of a secure channel during the previous (first) data access session), the server 16 (by repeating the previous steps 22, 24, 26, 28 with an unsecure channel (instead of a secure channel), 210, 212 and 214) determines, according to the DDAP, the data access decision, then the server 16 does not authorize access to the requested data, according to the DDAP (in case of DDAP5), by sending to the PC 14 a corresponding (data access request) response refusal message (not represented).

The invention solution provides stronger data protection since it may take into account an anomaly detection between two data access sessions and change, based on the DDAP, the current data access decision with respect to one or several previous positive data access decisions.

According to a second scenario, once the server 16 has granted access to the concerned data during a first data access session and, during a second data access session, one of the PC 14 and the user 11, as the context signals, is no more successfully authenticated, the server 16 (by repeating the previous steps 22, 24, 26, 28, 210, 212 and 214) determines, according to the DDAP, the data access decision, then the server 16 does not authorize access to the requested data, according to the DDAP (in case of DDAP6), by sending to the PC 14 a corresponding (data access request) response refusal message (not represented).

The invention solution provides stronger data protection since it may take into account a context signal change between two data access sessions and change, based on the DDAP, the current data access decision with respect to one or several previous positive data access decisions.

The invention solution allows carrying out a dynamic and continuous protection against data breaches and data leaks.

The embodiment that has just been described is not intended to limit the scope of the concerned invention. Other embodiments may be given. As another embodiment, instead of using two separate devices, one and the same device implements the claimed invention method.

The invention claimed is:

1. A method for managing access to data stored in a computer environment, comprising:
   receiving, by a first device, at least one request for accessing data;
   capturing, by the first device, data relating to at least one current context signal during each and every data access request, wherein each and every data access request is distinct from an original login data access request;
   selecting, by the first device, at least one piece of the captured data relating to the at least one current context signal based on at least one corresponding predetermined authorization policy, wherein the selection of at least one piece of the captured data relating to the at least one current context signal is carried out in response to each and every data access request;
   comparing, as a current authorization step, by the first device or a second device connected or coupled to the first device, the selected data relating to at least one captured current context signal to predetermined reference data relating to at least one corresponding context signal according to the at least one corresponding authorization policy, wherein the comparison of respective selected data relating to the at least one captured context signal and respective reference data relating to the at least one corresponding context signal is carried out in response to each and every data access request;
   determining, by the first or second device, based upon (a) whether the selected data relating to the at least one captured current context signal matches the reference data relating to the at least one corresponding context signal according to the at least one corresponding authorization policy and (b) at least one predetermined dynamic data access policy, whether the data access is or is not authorized, as a dynamic data access decision; and
   issuing, by the first or second device, the dynamic data access decision, the dynamic data access decision being either a data access authorization or a data access deny.

2. Method according to claim 1, wherein, if the data access is authorized, then the data is accessed according to the at least one dynamic data access policy, the at least one dynamic data access policy including at least one element of a group comprising:
   a data reading entitlement,
   a data sharing entitlement,
   a data creation entitlement,
   a data removal entitlement,
   a data update entitlement,
   a data writing entitlement and a metadata update entitlement, the metadata being associated with the concerned data.

3. Method according to claim 1, wherein, if the data access is authorized, then the at least one dynamic data access policy includes at least one element of a group comprising, as at least one additional condition to be satisfied:
   requesting to further authenticate the requester prior to granting access to data;
   carrying out at least one action prior to granting access to data;
   carrying out at least one action after granting access to data;
   sending at least one predetermined alert message to at least one predetermined addressee.

4. Method according to claim 1, wherein, if the data access is not authorized, then the data is not accessed according to the at least one dynamic data access policy.

5. Method according to claim 4, wherein, when the data access is not authorized, the at least one dynamic data access policy includes at least one element of a group comprising:
   sending at least one predetermined alert message to at least one predetermined addressee;
   sending a data access request response refusal;
   sending a data access request response refusal accompanied with at least one reason;
   requesting to further authenticate the requester;
   carrying out at least one action; and
   disconnecting the open requester session.

6. Method according to claim 1, wherein the method further comprises at least one anomaly detection, the at least one anomaly detection comprising detecting a change of at least one of the at least one captured current context signal with respect to at least one corresponding captured previous context signal, the at least one dynamic data access policy being able to change when at least one of the at least one anomaly detection occurs.

7. Method according to claim 1, wherein at least one of the at least one dynamic data access policy changes when at least one of the at least one captured current context signal has changed with respect to a corresponding captured previous context signal or a corresponding reference context signal.

8. Method according to claim 1,
wherein the original login data access request is valid for one and the same user; and
wherein each and every data access request of a plurality of data access requests is valid for the user.

9. A first device for managing access to data stored in a computer environment, wherein the first device includes at least one processor and is configured to:
receive at least one request for accessing data;
capture data relating to at least one current context signal during each and every data access request, wherein each and every data access request is distinct from an original login data access request;
select at least one piece of the captured data relating to the at least one current context signal based on at least one corresponding predetermined authorization policy, wherein the selection of at least one piece of the captured data relating to the at least one current context signal is carried out in response to each and every data access request;
compare, as a current authorization, the selected data relating to at least one captured current context signal to reference data relating to at least one corresponding context signal according to the at least one corresponding predetermined authorization policy, wherein the comparison of respective selected data relating to the at least one captured context signal and respective reference data relating to the at least one corresponding context signal is carried out in response to each and every data access request;
determine, based upon (a) whether the selected data relating to the at least one captured current context signal matches the reference data relating to the at least one corresponding context signal according to the at least one corresponding authorization policy and (b) at least one predetermined dynamic data access policy, whether the data access is or is not authorized, as a dynamic data access decision; and
issue the dynamic data access decision, the dynamic data access decision being either a data access authorization or a data access deny.

10. A second device for managing access to data stored in a computer environment, wherein the second device includes at least one processor and is configured to:
receive data relating to at least one captured current context signal during each and every data access request, wherein each and every data access request is distinct from an original login data access request;
select at least one piece of the captured data relating to the at least one current context signal based on at least one corresponding predetermined authorization policy, wherein the selection of at least one piece of the captured data relating to the at least one current context signal is carried out in response to each and every data access request;
compare, as a current authorization, the selected data relating to at least one captured current context signal to predetermined reference data relating to at least one corresponding context signal according to the at least one corresponding authorization policy, wherein the comparison of respective selected data relating to the at least one captured context signal and respective reference data relating to the at least one corresponding context signal is carried out in response to each and every data access request;
determine, based upon (a) whether the selected data relating to the at least one captured current context signal matches the reference data relating to the at least one corresponding context signal according to the at least one corresponding authorization policy and (b) at least one predetermined dynamic data access policy, whether the data access is or is not authorized, as a dynamic data access decision; and
issue the dynamic data access decision, the dynamic data access decision being either a data access authorization or a data access deny.

11. A system for managing access to data stored in a computer environment, wherein the system comprising a first device and at least one second device, the second device being connected or coupled to the first device, the first device is configured to:
receive at least one request for accessing data;
capture data relating to at least one current context signal during each and every data access request, wherein each and every data access request is distinct from an original login data access request;
send to the second device the data relating to at least one captured current context signal; and
wherein the second device is configured to:
select at least one piece of the captured data relating to the at least one current context signal based on at least one corresponding predetermined authorization policy, wherein the selection of at least one piece of the captured data relating to the at least one current context signal is carried out in response to each and every data access request;
compare, as a current authorization, the selected data relating to at least one captured current context signal to predetermined reference data relating to at least one corresponding context signal according to the at least one corresponding authorization policy, wherein the comparison of respective selected data relating to the at least one captured context signal and respective reference data relating to the at least one corresponding context signal is carried out in response to each and every data access request;
determine, based upon (a) whether the selected data relating to the at least one captured current context signal matches the reference data relating to the at least one corresponding context signal according to the at least one corresponding authorization policy and (b) at least one predetermined dynamic data access policy, whether the data access is or is not authorized, as a dynamic data access decision; and
issue the dynamic data access decision, the dynamic data access decision being either a data access authorization or a data access deny.

* * * * *